Patented May 6, 1924.

1,493,403

UNITED STATES PATENT OFFICE.

TIMOTHY THOMPSON, OF PHILADELPHIA, PENNSYLVANIA, ASSIGNOR OF ONE-HALF TO JOSEPH RUSSELL, OF PHILADELPHIA, PENNSYLVANIA.

COMPOSITION FOR TREATING FUEL.

No Drawing. Application filed April 26, 1923. Serial No. 634,847.

*To all whom it may concern:*

Be it known that I, TIMOTHY THOMPSON, citizen of the United States, residing at Philadelphia, State of Pennsylvania, have invented new and useful Improvements in Composition for Treating Fuel, of which the following is a specification.

The present invention relates to an improvement in a composition for application to coal, in order to make the coal burn more completely and more perfectly and to produce considerably more heat. The use of this composition causes the fire to burn more evenly, causes all gases and combustible vapors evolved from the coal to burn completely, keeps the boiler clean and effects great economy in the use of fuel.

The material can be applied either to hard coal, soft coal, or coke or other similar fuel, and of these fuels much better results are produced by applying the material to hard coal than to any of the other coals mentioned.

In the preferred form of execution of my invention, I mix together, preferably in the following order, the materials mentioned and preferably in the proportions given:

1 pound of calcium chloride,
1 pound of ammonium chloride,
1 pound of potassium nitrate,
½ pound of powdered sulfur,
2 ounces of lamp black,
1 gallon of water,
½ pound of common salt.

The first three materials alone can be used with water, but superior results are produced when all of the components are used.

The sulfur in the composition produces a hardening or petrification of the coal, and in some cases, this material can be omitted. However, very much better results are produced when this material is added. The sulfur should be used in the form of a very fine powder, preferably of a degree of fineness comparable with ordinary wheat flour.

The lamp black aids in producing a desired consistency in the product but this material can be omitted, if desired.

The common salt added is preferably white (that is, free from large amounts of colored impurities). The function of the salt is to keep the tubes of the boiler or other metal parts of the boiler clean, whereby the heat from the combustion of the fuel is more fully taken up by the water in the boiler.

The above quantities produce about 1 gallon of the solution or liquid, which either after or before cooling is preferably strained through a cheese cloth or other strainer of about that degree of fineness, to take out any considerable amounts of solid coarse impurities.

The composition can be sprinkled over the coal when the same is spread out on the floor or when the same is in a bin or box, but it is preferable to spread the liquid, as a fine spray, on the coal after the same is placed in the furnace. In ordinary practice the best results have been secured by spraying the liquid upon the coal directly after the same is placed into the furnace. The amount of material sprayed upon the fuel can be varied more or less, but the best results have been secured when spraying about 1 gallon of the liquid to each ton of hard coal or about 2 gallons of the liquid to each ton of soft coal or coke. Comparative tests have shown that when using this material on hard coal, only about one-half of the quantity of coal is necessary, to run the boiler in question.

I claim:

1. A composition for treating fuel containing water, calcium chloride, ammonium chloride, and potassium nitrate.

2. A composition for treating fuel containing calcium chloride, ammonium chloride, potassium nitrate, sulfur, carbon black, water, and salt.

3. A composition of matter containing 1 pound each of calcium chloride, ammonium chloride, and potassium nitrate, in 1 gallon of water.

4. A composition of matter for treating fuel containing 1 pound each of calcium chloride, ammonium chloride, potassium nitrate, ½ pound each of finely powdered sulfur and common salt, and 2 ounces of carbon black to 1 gallon of water.

In testimony whereof I affix my signature.

TIMOTHY THOMPSON.